(12) United States Patent
Grunkin et al.

(10) Patent No.: US 6,226,393 B1
(45) Date of Patent: May 1, 2001

(54) METHOD FOR ESTIMATING THE BONE QUALITY OR SKELETAL STATUS OF A VERTEBRATE

(75) Inventors: Michael Grunkin; Anders Rosholm, both of Copenhagen (DK); Payman Sadegh, Baltimore, MD (US)

(73) Assignee: Torsana Osteoporosis Diagnostics A/S, Vedbaek (DK)

(*) Notice: Subject to any disclaimer, the term of this patent is extended or adjusted under 35 U.S.C. 154(b) by 0 days.

(21) Appl. No.: 09/446,067

(22) PCT Filed: Jul. 6, 1998

(86) PCT No.: PCT/DK98/00311

§ 371 Date: Dec. 17, 1999

§ 102(e) Date: Dec. 17, 1999

(87) PCT Pub. No.: WO99/01835

PCT Pub. Date: Jan. 14, 1999

(30) Foreign Application Priority Data

Jul. 4, 1997 (DK) .................................. 97 00815

(51) Int. Cl.$^7$ .................................... G06T 5/00
(52) U.S. Cl. .................. 382/128; 382/264; 382/132; 600/407; 378/18; 514/451
(58) Field of Search .................. 382/128, 132, 382/264; 128/661, 660, 653; 424/551; 514/451, 54; 378/18; 395/13; 600/407

(56) References Cited

U.S. PATENT DOCUMENTS

| | | | |
|---|---|---|---|
| 4,663,772 | * 5/1987 | Mattson et al. | 378/18 |
| 4,721,112 | 1/1988 | Hirano et al. | 600/436 |
| 4,829,549 | 5/1989 | Vogel et al. | 378/55 |
| 4,913,157 | * 4/1990 | Pratt, Jr. et al. | 128/661 |
| 4,926,870 | 5/1990 | Bradenburger | 128/660 |
| 5,247,934 | * 9/1993 | Wehrli et al. | 128/653 |
| 5,568,590 | * 10/1996 | Tolson | 395/13 |
| 5,574,022 | * 11/1996 | Roberts et al. | 514/54 |
| 5,641,518 | * 6/1997 | Badylak et al. | 424/551 |
| 5,784,499 | * 7/1998 | Kuwahara et al. | 382/264 |
| 5,915,036 | * 6/1999 | Grunkin et al. | 382/132 |
| 5,931,780 | * 8/1999 | Giger et al. | 600/407 |
| 6,022,887 | * 2/2000 | Gasper et al. | 514/451 |

FOREIGN PATENT DOCUMENTS

| | | | |
|---|---|---|---|
| 9514431 | 11/1994 | (WO) | G06I/7/00 |
| 9607161 | 8/1995 | (WO) | G06T/7/00 |

OTHER PUBLICATIONS

Harry K. Genant, M.D., "Radiology of Osteoporosis and Other Metabolic Bone Diseases," Osteoporosis Metabolic Bone Diseases, Chapter 24, pp. 152–163.

T. Derisquebourg et al, Calcified Tissue International, 1994, 54, pp. 461–465.

MTA Rehman et al, Journal of Clinical Pathol. 1994, 47, pp.529–534.

(List continued on next page.)

*Primary Examiner*—Matthew C. Bella
*Assistant Examiner*—M B Choobin

(57) ABSTRACT

A method for estimating the bone quality, or skeletal status of a vertebrate on the basis of two-dimensional image data of cortical bone, and which is determined from a density variation of the cortical bone. Intra cortical resorption, scalloping, spongiosation, striation, periosteal resorption, and/or endosteal resorption caused by osteoporosis, osteopenia or hyperparathyroidism may be determined as oblong density variations detected by filtering the image data with two oblong Gaussian kernels (using a Difference Of Gaussian technique) or at corresponding frequencies in the power spectrum.

22 Claims, 7 Drawing Sheets

OTHER PUBLICATIONS

Figures 1, 2:
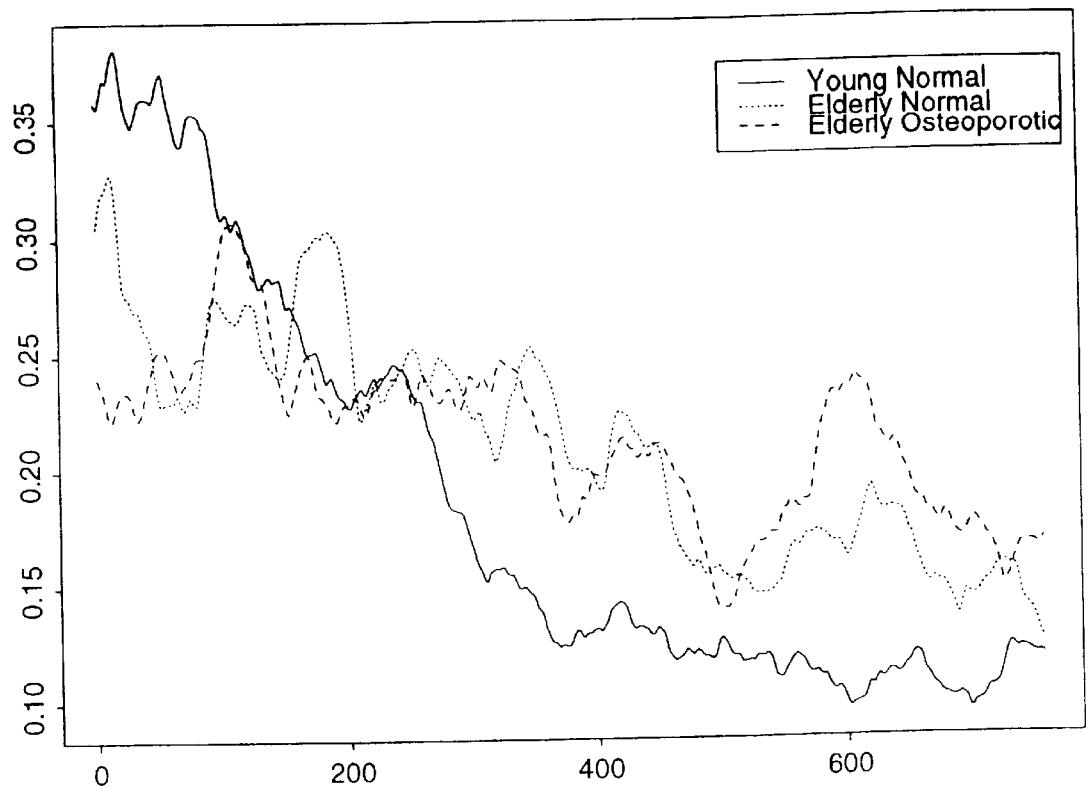

Chair–Li Chang et al, Med. Phys. 20 (4), Jul./Aug. 1993, pp.983–992.

G. Dougherty, Med. Eng. Phys. vol. 18, No. 7, Oct. 1996, pp. 557–568.

J.A. Spadaro et al, Journal of Orthopaedic Research, 1994, pp. 211–218.

T. Steiniche et al, Bone, vol. 15, No. 1, 1994 pp. 73–79.

F.H. Dujardin et al, Med. Eng. Phys. vol. 18, No. 6, pp. 489–494.

Lent C. Johnson, M.D., "Morphologic Analysis in Pathology: The Kinetics of Disease and General Biology of Bone", pp.543–654.

H.E. Meema, M.D. Skeletal Radiology.,2, (1977), pp.11–19.

H. Erik Meema et al, "Microradioscopic Morphometry of Intraocortical Resorption in Hand Bones in Normals and in Chronic Renal Failure Patients: Grading Versus Measurements", pp.401–446.

R.W. Norrdin et al, Metab. Bone Dis.& Rel. Res. 5, 1983, pp.353–359.

Calculation Model, "Zero Crosings of the Second Derivative".

Recognition of cortical bone resorption in metabolic bone disease in vivo, By H.E. Meema.MD, 1977.*

* cited by examiner

| CRI | Wrist BMD | | Hip BMD | | Spine BMD | |
|---|---|---|---|---|---|---|
| Radius | -0.81 | -0.84 | -0.76 | -0.73 | -0.74 | -0.73 |
| Ulna | -0.81 | -0.82 | -0.76 | -0.79 | -0.69 | -0.69 |
| Both | -0.85 | -0.87 | -0.80 | -0.81 | -0.75 | -0.76 |
| | Corr. | rank corr. | Corr. | rank corr. | Corr. | rank corr. |

METHOD FOR ESTIMATING THE BONE QUALITY OR SKELETAL STATUS OF A VERTEBRATE

This application is the national phase under 35 U.S.C. §371 of PCT International Application No. PCT/DK98/00311 which has an International filing date of Jul. 6, 1998, which designated the United States of America.

The present invention relates to a method for estimating aspects of the bone quality or skeletal status of a vertebrate on the basis of two-dimensional image data comprising information relating to the cortical structure of at least a part of a bone, typically a long or tubular bone. Especially bones comprising a tube (diaphysis) and at least at one end an epiphysis comprising trabecular bone are suitable for use in the present method.

In the present context, skeletal status is taken to relate to e.g. biomechanical competence, cortical homogeneity, cortical resorption (intra-cortical and endosteal resorption), cortical thickness of the bone or a quantification of sensitivity, specificity or accuracy of diagnosis of osteoporosis.

Thus, in a first aspect, the invention relates to a method for estimating the bone quality or skeletal status of a vertebrate on the basis of two-dimensional image data comprising information relating to the cortical bone of at least a part of a bone of the vertebrate, the image data being data obtained by exposing at least the part of the bone to electromagnetic radiation, the method comprising:

determining at least one value representing a variation of a density of cortical bone of the at least part of the bone, an estimation procedure in which the bone quality or skeletal status of the vertebrate is estimated on the basis of the at least one variation value, and optionally one or more features related to the bone of the vertebrate, and a predetermined relationship between the at least one variation value and optional feature(s) and reference skeletal status or bone quality parameters.

As indicated above, in the present context "skeletal status" is not simply equalled to "bone quantity", such as Bone Mineral Density, as a loss of cortical tissue (cortical resorption) or cortical inhomogeneity may lead to a disproportionate loss of biomechanical competence.

In fact, it is contemplated that a better estimate of skeletal status or bone quality may be obtained by considering pertinent properties of cortical and cancellous bone individually instead of treating these two types of bones similarly, as it is done in standard densitometric methods.

Normally, at least one variation value will represent a variation in values reflecting a projected cortical density (PCD) in the image data, caused by the X-ray attenuating properties of cortical bone in the part of the bone.

Also, the image data will typically comprise discrete elements (pixels) each relating to an individual part of the bone and each having a value relating to a projected cortical density in the image data at the individual part of the bone.

In one embodiment, one or more of the at least one variation value is/are determined by (a) determining values reflecting the projected cortical density (PCD) in the image data, caused by the X-ray attenuating properties of cortical bone in the part of the bone, for each of a number of locations or areas in the image data, (b) deriving the one or more variation values from a variation of the determined PCD-values, preferably in a longitudinal direction of the bone.

Even though it is contemplated that the variation of PCD may be used in the present embodiment for substantially all directions in the bone, especially that of the longitudinal direction is found interesting, and especially in long bones, such as the tibia, ulna, and the distal radius, where strong relations to other measures of skeletal status or bone quality have been found.

In fact, it is contemplated that a large number of variation values derived from this variation of PCD in the longitudinal direction of the bone will provide a significant correlation with the failure load of e.g. the hip.

In order to facilitate the determination of the Regions Of Interest used in the bones and to enhance repeatability of the method, it is preferred that the PCD-values are determined at locations or areas situated longitudinally spaced apart within the bone. It is currently preferred that the locations or areas for which the PCD-values are determined are located at predetermined areas or positions in the image, such as along a reproducibly positionable curve in the image, preferably a substantially straight line substantially along a longitudinal axis of the bone.

The PCD-values may be determined in a number of ways, and they may be chosen to relate to different properties of the projected cortical structure. At present, the PCD-value determined for each of the locations or areas may be a value relating to first, second, third or higher order properties of the image data relating to the projected cortical structure at the location or in the area in question.

Preferably, the PCD-values are calculated on the basis of a determination of any property of the Fourier power spectrum, a parametric spectral estimate or of the grey level co-occurrence matrix of information in the image data at the location or in the area in question, the variance of the image data at the location or in the area in question, or a mean value of the size and density of edges in the image data at the location or in the area in question.

Preferably, a PCD-profile is defined by the determined PCD values and a (preferably reproducible) measure relating to the positions of the areas or positions in relation to each other or in relation to a fixed position within the bone, such as, the determined PCD-values as a function of eg a distance from the location or area for which the individual PCD-value was determined to a predetermined reference point. In this situation, at least one of the above one or more variation values is derived from the profile. Values from this profile have been found to correlate especially well with parameters of skeletal status or bone quality. Preferably, the predetermined reference point is also located on the line along which the PCD values are extracted.

Thus, the PCD-profile preferably describes the PCD as a function of the distance between the area or position at which the individual value was derived and the predetermined reference point.

This profile has the advantage that reproducible information may be derived from all bones independently of the size and shape of the bone in question. Moreover, this type of measurement gives a global description of the skeletal status or bone quality as opposed to measuring in a region of interest chosen more or less ad hoc.

It is preferred that the locations or areas for which the PCD-values are determined are situated at locations or areas within the bone at which the image data show substantially no projected trabecular structure.

The fluctuation or variation of the PCD-profile is of interest. Therefore, one or more variation values are preferably derived from this fluctuation or variation. Such a value may be derived from a polynomial fitted to the profile or from the standard deviation of the difference between the polynomial and the profile or a smoothed version thereof. In these situations, the polynomial is preferably of an order in the interval 1–10, such as 2–5, preferably 3–4.

An optional or additional variation value may be derived from the standard deviation of a difference between the profile or a smoothed version thereof and a morphological opening or closing of the profile or of a smoothed version of the morphological opening or closing of the profile.

In another embodiment, one or more of the variation values is/are determined as a variation within a predetermined Region Of Interest in the image data. Thus, instead of using a number of different locations or areas, the information from within a single area may be used in a calculation of one or more variation values all relating to the same area.

However, no matter whether the variation is determined from a number of positions or areas or from a single Region Of Interest, the calculations in the regions or at the positions may be performed in the same manners, and one or more of the at least one variation value may be obtained in a number of manners:

a fractal dimension of the variation of the density may be determined, and one or more of the at least one variation value may be obtained on the basis of the fractal dimension, a Fourier spectrum may be generated on the basis of the image data, and one or more of the at least one variation value may be obtained on the basis of one or more frequencies in the Fourier spectrum, the image data may be subjected to a thresholding splitting the elements of the image data into two groupings, a first grouping having values above a predetermined threshold value and a second grouping having values under the predetermined threshold value, and one or more of the at least one variation value may be obtained on the basis of a size of one or more coherent groups of elements all of which are part of the first or the second grouping, and/or one or more of the at least one variation value may be obtained on the basis of a variance of the values of elements within a predetermined region of interest of the image data.

In fact, any known method for determining or evaluating a variation in two-dimensional image data will be able to generate a value relating to the bone quality or skeletal status when used to determine cortical inhomogeneity.

An especially interesting effect or implication caused by osteoporosis, osteopenia or hyperparathyroidism or other bone disorders is called "intra cortical resorption", "periosteal resorption", "endosteal resorption", "striation", "scalloping", or "spongiosation". It is believed that this spongiosation may be seen in the image data as oblong density variations, whereby the at least one variation value in this situation preferably is determined from oblong density variations in the image data.

As spongiosation may be seen as oblong channels, tunnels, valleys, or grooves extending in a longitudinal direction of the cortical bone, the at least one value is preferably determined from oblong density variations extending at least substantially in a longitudinal direction of the bone.

It is believed that different disorders or diseases may cause spongiosation having different typical length to width ratios. However, normally, the oblong density variations may have a length to width ratio of at least 1½:1, such as at least 2:1, such as at least 2½:1, preferably at least 3:1, such as at least 3.5:1, preferably at least 4:1, such as at least 4.5:1.

Also, preferably the oblong density variations have a length to width ratio in the interval 1½–8:1, such as 1.7–6:1, preferably 2–4:1.

Especially in the case where spongiosation is sought quantified, the density variations seen in the image data may relate to density variations in the bone may having a length in the interval of 0.4–15 mm, such as in the interval 0.5–12 mm, preferably in the interval 0.8–10 mm, such as in the interval 1–8 mm, such as on the order of 2 mm, and a width in the interval 0.1–6 mm, such as in the interval 0.13–5 mm, preferably in the interval 0.15–3 mm, such as in the interval 0.17–2 mm, preferably in the interval 0.18–1 mm, such as on the order of 0.2–0.4 mm.

The typical width of a cortical porosity caused by a bone remodelling unit is 0.2–0.4 mm.

Normally, when obtaining image data from X-ray radiation, the dimensions of the image data will correspond quite well with those of the actual bone. Normally, the magnification will be under 20% and most often under 5%. In that situation, the oblong density variations of image data would have a length in the interval of 0.4–15 mm, such as in the interval 0.5–12 mm, preferably in the interval 0.8–10 mm, such as in the interval 1–8 mm, such as on the order of 2 mm, and a width in the interval 0.1–6 mm, such as in the interval 0.13–5 mm, preferably in the interval 0.15–3 mm, such as in the interval 0.17–2 mm, preferably in the interval 0.18–1 mm, such as on the order of 0.2–0.4 mm. Otherwise, these dimensions should be scaled to the magnification between the actual bone and the image data.

The actual determination of the variation value from these oblong density variations may be made in a number of manners. In one situation, the determined variation value is determined from a number of oblong density variations in the image data, a mean width thereof, and/or a mean length thereof.

In another situation, the determined variation value may be determined from a grey value difference between the oblong density variations and other parts of the image data.

Also, there are a number of manners of actually determining or identifying the oblong density variations or the variation value based thereon.

One manner is where the variation value is determined by:
obtaining the power spectrum relating to the image data,
identifying parts thereof relating to frequencies or frequency intervals corresponding to predetermined dimensions or dimension intervals of the oblong variations, and
a) estimating the energy at or within the frequencies or frequency intervals, and/or
b) removing at least substantially all other parts of the power spectrum, inversely Fourier transforming the resulting power spectrum, and determining a variation of the grey levels of the resulting image.

Naturally, the actual frequency in a power spectrum will depend on e.g. the resolution of the original image data. However, based on the sizes of the phenomena in the bone, the corresponding physical frequency may easily be derived.

Thus, using these methods, the frequencies or frequency intervals may be different for the two dimensions in the image data and power spectrum, whereby those absolute dimensions of the oblong density variations that are sought after will be selectable. These frequencies will correspond directly to the dimensions thereof in the image data—and thus also to those in the bone.

Another manner of determining the variation value is by filtering the image data with an oblong Gaussian Kernel and subsequently determining a variation of grey levels of the resulting image.

An especially preferred manner is one where the variation value is determined by filtering each two copies of the image data with an oblong Gaussian Kernel, the two oblong Gaussian kernels having different dimensions, and subsequently subtracting the two resulting image data and determining a variation of grey levels of the resulting image.

In that situation, the oblong kernel may have a length to width ratio of at least 1½:1, such as at least 2:1, such as at least 2½:1, preferably at least 3:1, such as at least 3.5:1, preferably at least 4:1, such as at least 4.5:1.

Also, preferably, the oblong kernel(s) has/have a length to width ratio in the interval 1½–8:1, such as 1.7–6:1, preferably 2–4:1.

Also or otherwise, the oblong kernel may have a length in the interval of 1–15 mm, such as in the interval 2–12 mm, preferably in the interval of 0.4–15 mm, such as in the interval 0.5–12 mm, preferably in the interval 0.8–10 mm, such as in the interval 1–8 mm, such as on the order of 2 mm, and a width in the interval 0.1–6 mm, such as in the interval 0.13–5 mm, preferably in the interval 0.15–3 mm, such as in the interval 0.17–2 mm, preferably in the interval 0.18–1 mm, such as on the order of 0.2–0.4 mm—or scaled with a difference in magnification between the bone and the image data.

When using two kernels on two copies of the image data, a so-called Difference of Gaussian may be used where the other (different from the above one) kernel has a length in the interval of 1–15 mm, such as in the interval 1.3–10 mm, preferably in the interval 1½–6 mm, such as in the interval 2–4 mm, such as on the order of 3 mm, and a width in the interval 0.4–6 mm, such as in the interval ½–5½ mm, preferably in the interval 0.7–5 mm, such as in the interval 1–2½ mm, preferably in the interval 1.2–2 mm, such as on the order of 1½ mm.

In that situation, due to the typical dimensions of the cortical density variations, the smaller kernel will smooth the image data within the width of these variations and the larger kernel will smooth the larger variations, whereby the resulting image will have the dimensions of the sought after density variations enhanced.

Also, due to the function of the filtering with the larger kernel, using this technique, no additional removal of especially lower frequency noise may be required.

A third manner of determining the at least one variation value is by:
  providing a pre-determined template of the oblong density variations,
  template matching parts of the image data with the predetermined shape so as to identify oblong density variations,
  determining the variation value from:
    the number of identified oblong density variations,
    a grey value difference between the identified oblong density variations and other parts of the image data,
    an average length and/or width of the identified oblong density variations.

In this manner, the template is scanned over the image data or parts thereof, and the density variations are detected at positions where there is a predetermined correlation between the template and the density information of the image data.

In fact, as mentioned above, it cannot be ruled out that different disorders or diseases cause different measurable differences in the spongiosation, whereby different sizes of kernels or different frequencies in the power spectrum may be used for determining not only the spongiosation, bone quality, and/or skeletal status, but also which disorder or disease causes it.

Normally, and especially in in vivo measurements, the image data relating to the bone will be superimposed with low frequency information not relating thereto.

This low frequency content of the image data is typically caused by varying thickness of cortical bone, fat tissue and muscles of varying thickness as well as, e.g., inhomogeneous X-ray illumination of the part of the bone. Dual X-ray absorptiometry was invented to circumvent such problems relating to compensating for soft tissue. Also, other non-invasive image acquisition techniques, such as, e.g., MR and CT imaging may generate image data not automatically or not to the same degree "suffering from" this type of undesired effect.

Therefore, normally the image data, before the step of determining the at least one variation value, is subjected to a background correction procedure in which low frequency intensity variations not related to a cortical structure of the bone is reduced relative to image data related to the cortical structure of the part of the bone.

One preferred way of reducing or preferably removing the low frequency information is using a background correction procedure comprising generating secondary image data as a result of performing a median filtering with a predetermined kernel size and subtracting this result from the original image data. One of the advantages of using a median filter is that this operation is edge preserving. This technique is known as "unsharp filtering".

Another way of reducing or preferably removing the low frequency information is using a background correction procedure comprising generating secondary image data as a result of performing a mean filtering with a predetermined kernel size and subtracting this result from the original image data. A mean filtering is typically much faster than the median filtering. However, the mean filtering is not edge preserving. Hence, the unsharp filtering may remove data we wish to include in the measurement.

It is typically preferred that the kernel size is at the most ½ of the image data, such as at the most ¼ of the image data, preferably at the most $\frac{1}{10}$ of the image data, more preferably at the most $\frac{1}{20}$ of the image data.

A third way of reducing or preferably removing the low frequency information is using a background correction procedure comprising globally fitting a two-dimensional polynomial to the image data and generating a background corrected image on the basis of the residuals of the fitting procedure. Apart from potential difficulties in determining the optimal order of the polynomial, which the person skilled in the art will know, this method potentially offers an extremely fast background correction of image data.

It is contemplated that a suitable order of the polynomial may be at the most 15, such as at the most 10, more preferably at the most 5.

Preferably, subsequent to the background correction procedure, the grey level distribution of the image data is standardized by performing a histogram stretch in order for the distribution to match a Gaussian. This step has the advantage that e.g. grey levels of different images may now be compared directly. This step is standard in image processing of this type.

In addition to the above-mentioned variation values derivable from the image data, it may be preferred to input additional data relating to the vertebrate in question but which may not be derivable from the image data. This type of data may be information relating to the age and/or sex, and/or species, and/or race and/or the specific bone considered in the vertebrate, and/or a estimated Bone Mineral Density, and/or a estimated Bone Mineral Content.

Even though the DXA- or SXA-BND determined using other equipment may be introduced in the estimation procedure, this measure may also optionally be determined from the image data. BMD is estimated by including data from a reference object in the exposure of the bone to the electromagnetic radiation and on the basis of the absorption of the electromagnetic radiation of the bone and of the reference object.

An especially preferred additional information to add to the features derived from the PCD-values is the thickness of the cortical bone of the same or another tubular bone of the vertebrate. Improved results are obtained, when indices relating to the thickness of the cortical shell of a bone, such as the Combined Cortical Thickness or a relative measurement as the Metacarpal Index, are used in the estimation procedure.

The above-mentioned model may be determined in a number of ways. However, establishing a model of this type requires obtaining corresponding values of all relevant features and an end point variable relating to eg the biomechanical competence, the diagnostic sensitivity, specificity or accuracy in the diagnosis of osteoporosis which is to be estimated by the estimation procedure.

The system will require a calibration against suitable index of skeletal status or bone quality. Examples of interesting skeletal status or bone quality parameters are the biomechanical competence, and/or a Bone Mineral Density measurement, and/or a Bone Mineral Content measurement, and/or treatment effect and/or fracture incidence and/or a score value by a skilled radiologist.

The method of the present invention will output a calibrated prediction of the chosen end point variable given a set of input variables: if the method is calibrated towards a strength parameter, the output of the method will relate to the strength of the bone in question.

It is expected that the present invention will be valuable in predicting the biomechanical competence through cortical homogeneity and/or cortical thickness of the bone and/or improved sensitivity, specificity or accuracy in the diagnosis of osteoporosis.

As the calibration of the estimation procedure will reflect a predetermined relation between image features and skeletal status or bone quality, this model should be chosen in a manner so that it correlates to the skeletal status or bone quality. The assessment of the extent to which the embodiments of the present invention are able to estimate skeletal status or bone quality may be performed by:

1. Prospective cohort-studies, in which odds ratio of any given type of fractures may be estimated for the given method,
2. case controlled studies, in which fracture cases and age-and-sex-matched controls are compared with respect to estimates to skeletal status obtained by the method according to the invention and optionally further to DXA-BMC measurements,
3. by relating bio-mechanical strength of bone specimens to estimates of the skeletal status according to the invention and optionally additionally DXA-BMC-measurements of the bone in question.

Using either distal radius, fibula, tibia, ulna, a metacarpal, a phalanges, or any bone, preferably a long or a tubula bone, in which two-dimensional image data comprising information relating to the cortical structure of the bone can be obtained, coherent values for determined bone strength, DXA-BMC and the estimate according to the present invention of the skeletal status or bone quality of the vertebrate may be obtained on the basis of a calibration using eg human post-mortem bone samples or samples from other vertebrates.

The calibration of the method of the present invention may also be obtained along the above-illustrated methods as these methods generate skeletal status or bone quality information and estimation on the basis of corresponding image data.

Bone strength may, e.g., be evaluated by directly measuring the plasticity and maximum load of a bone in a stress-strain diagram (See, e.g., Lis Mosekilde). However, the presently preferred manner of evaluating bone strength is using a setup determining the fracture load of the proximal femur and being designed to simulate a fall to the side of the individual.

In the method of the invention, substantially all types of models may be used for relating the chosen end point variables to a set of explanatory variables. At present, a preferred model is selected from the group consisting of: a General Linear Model, a Generalized Linear Model, an Artificial Neural Network, a Causal Probabilistic Net or Classification And Regression Trees.

As described above, the present method may be used to determine aspects of the skeletal status or bone quality of any vertebrate. Thus, the vertebrate may be a human, a horse, a great ape, a large ape, an anthropoid ape, a pig, a cow, etc, and the actual bone is preferably a tubular bone, such as a bone chosen from the group consisting of radius, ulna, tibia, fibula, metacarpal, phalanges, and femur. Especially bones comprising a tube (diaphysis) and at least at one end an epiphysis comprising trabecular bone are suitable for use in the present method.

Figure 3:
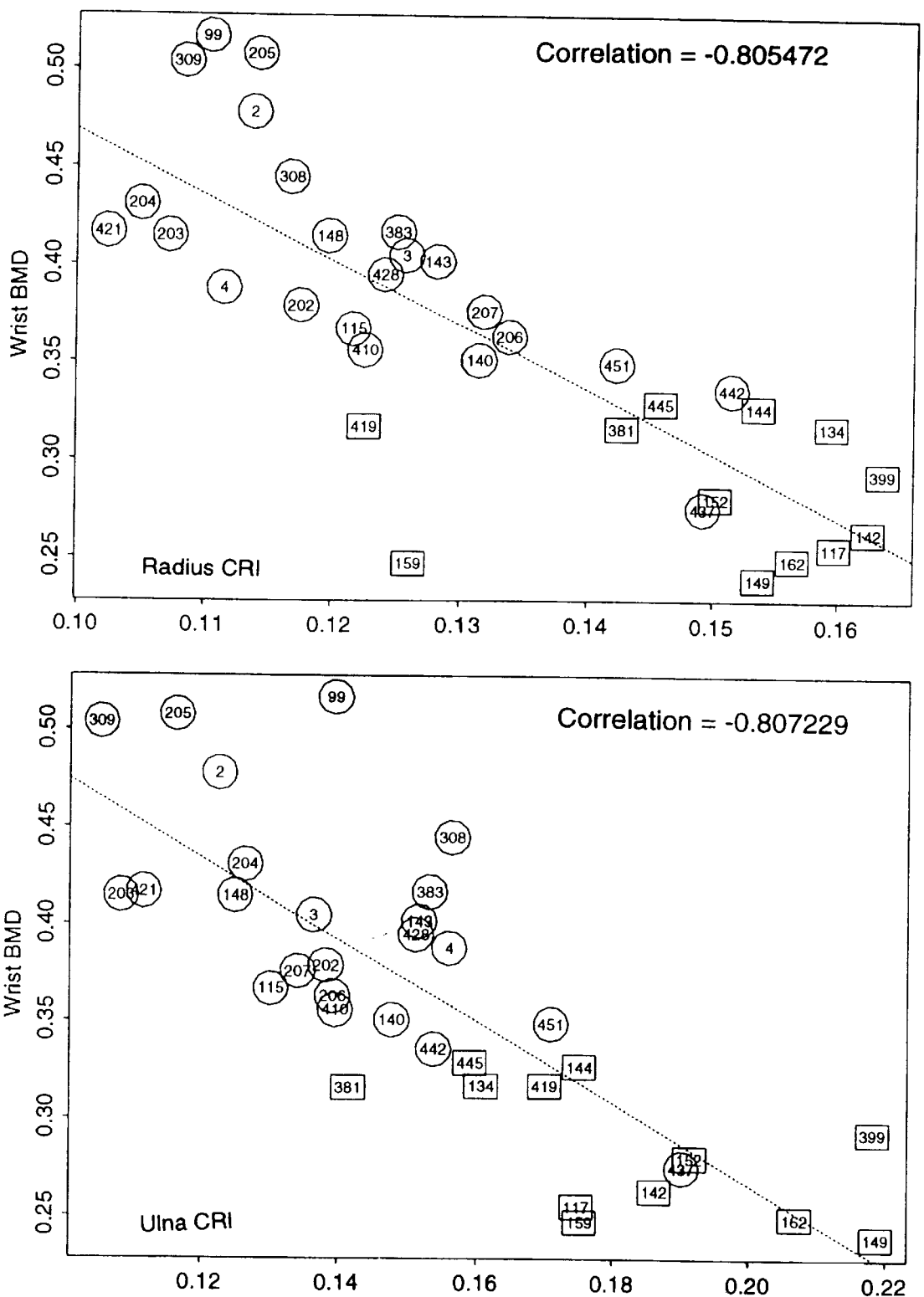
Figure 4:
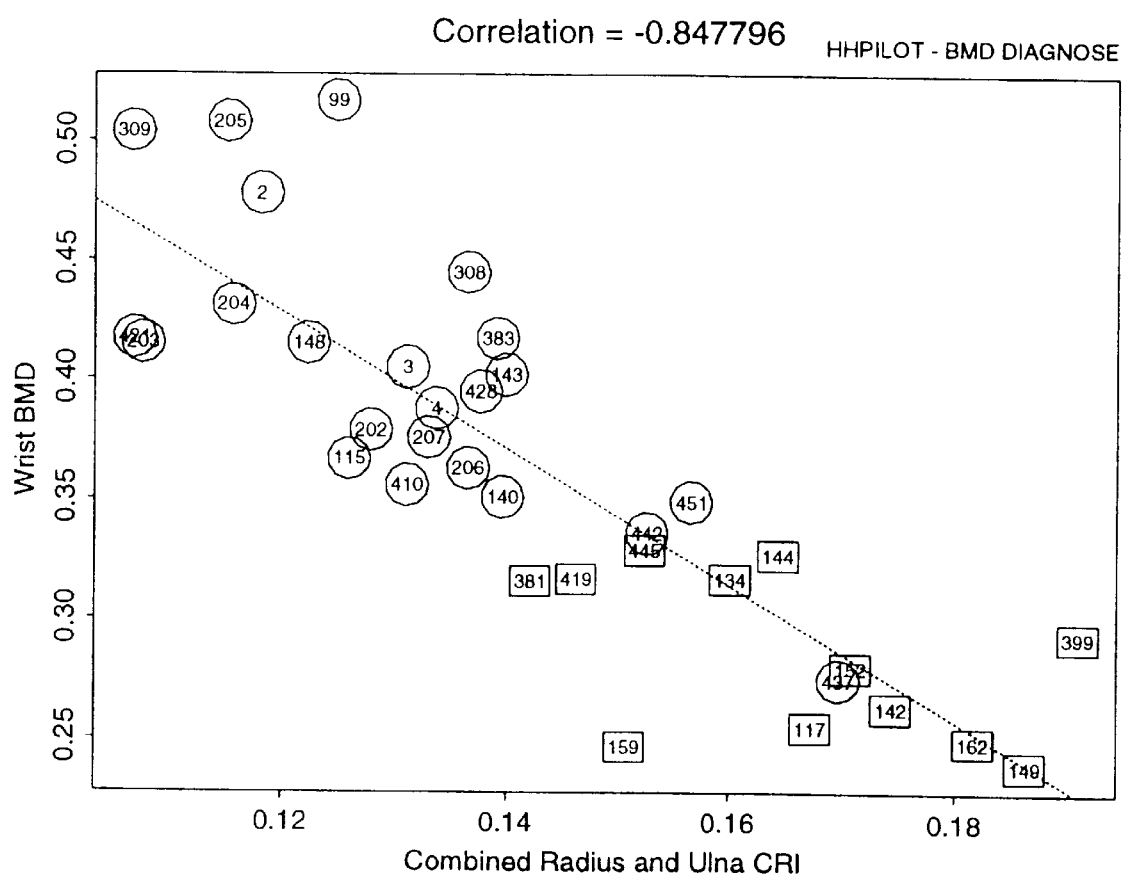
Figure 5:
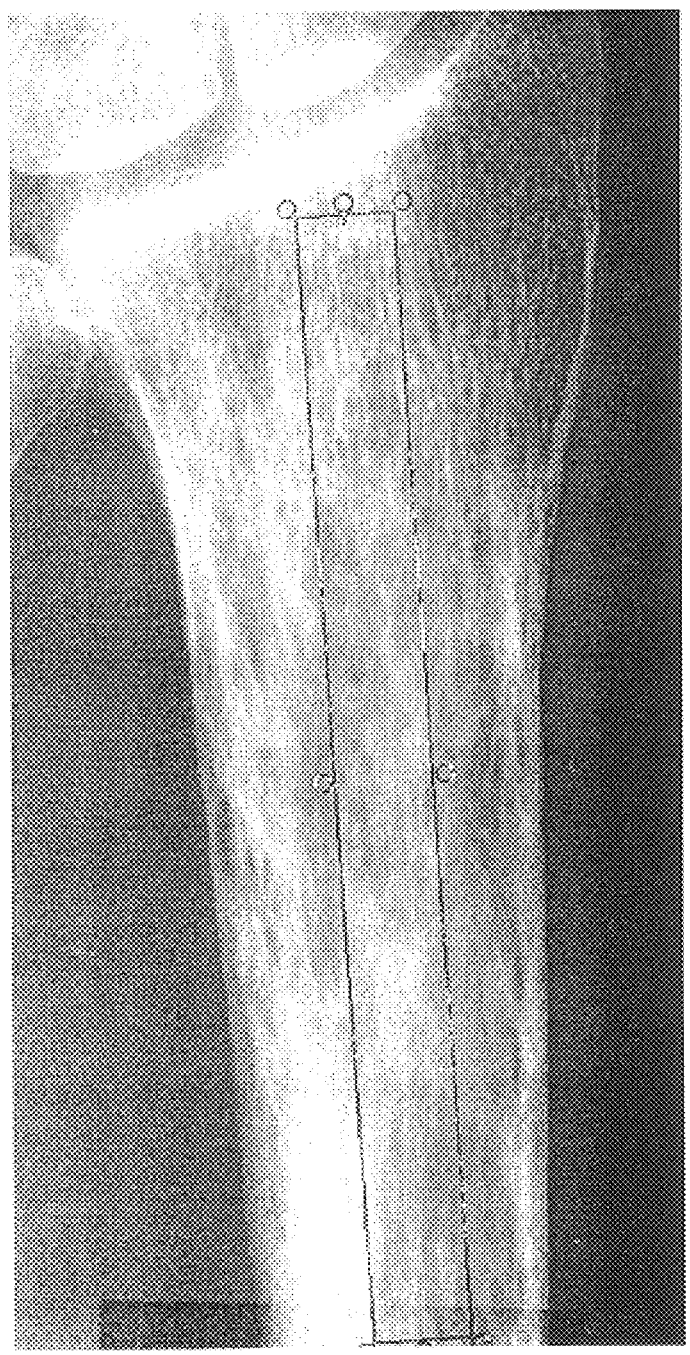
Figure 6:
Figure 7:
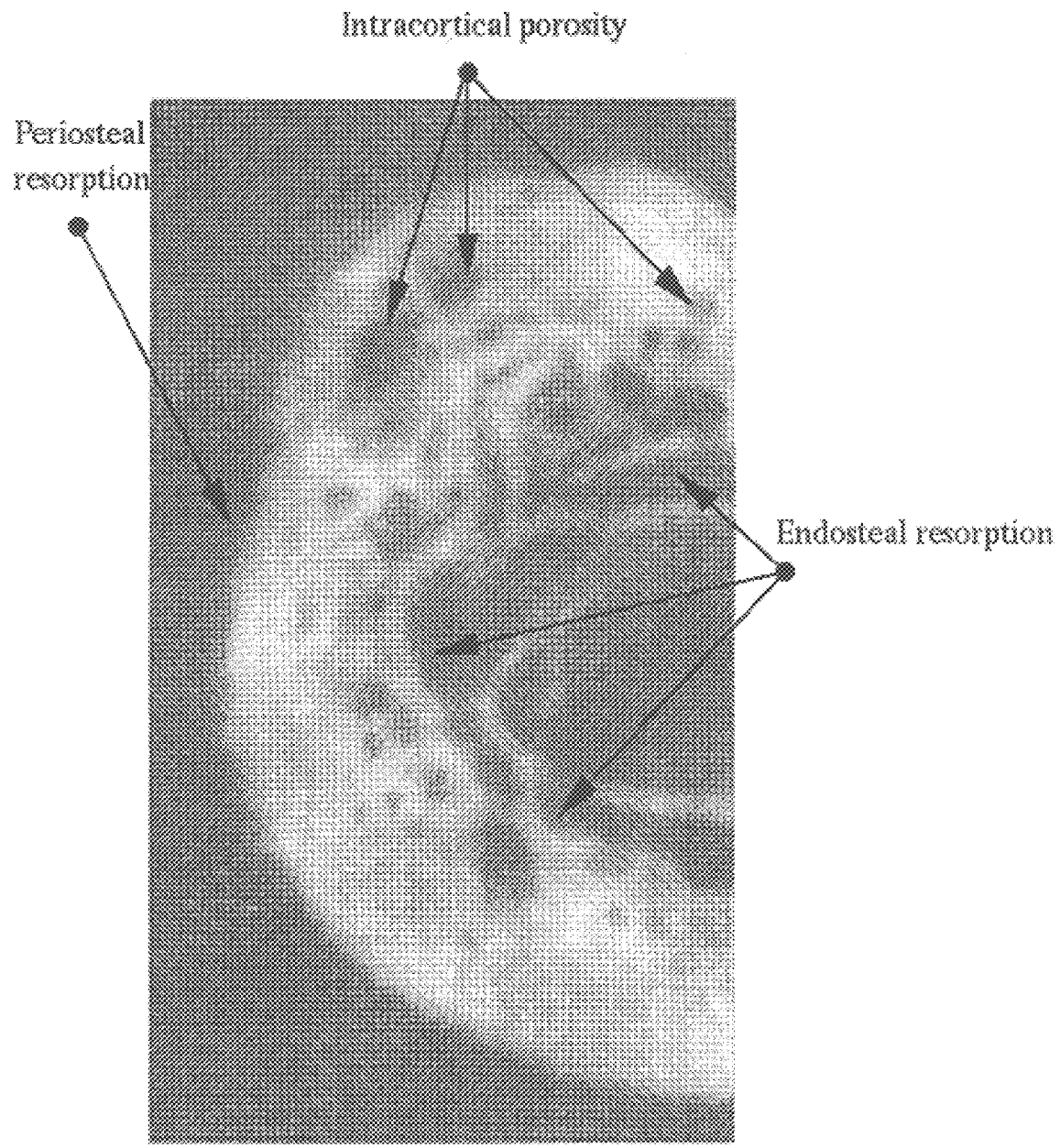
Figure 8:
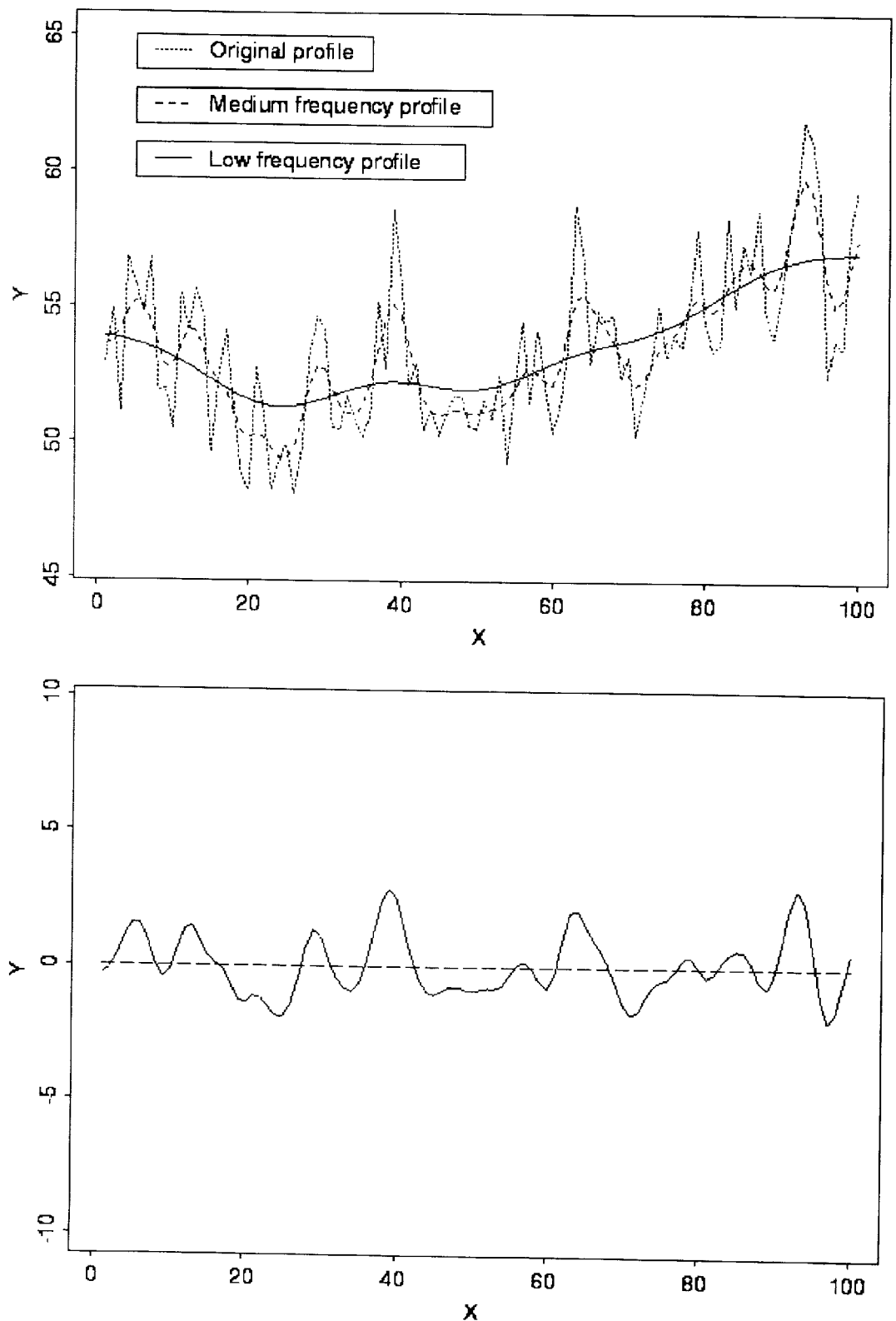

In the following, embodiments of the method of the inventior will be described with reference to the drawings, which:

FIG. 1 illustrates coefficient of variance profiles for a young normal person, an elderly normal person and an elderly osteoporotic person, FIG. 2 is a table illustrating the correlation of the CRI to various BMD measurements, FIG. 3 illustrates radius and ulna CRI plotted against wrist BMD, FIG. 4 illustrates the combined radius and ulna CRI plotted against wrist BMD, FIG. 5 illustrates the positioning of a ROI in a radius, FIG. 6 illustrates the positioning of a ROI in an ulna, FIG. 7 illustrates bone resorption types in a cross section of a radius, and FIG. 8 illustrates the use of a Difference Of Gaussians procedure.

PREFERRED EMBODIMENT ONE

As described above, one preferred method is one wherein a profile is generated which describes the density (or related values) in the longitudinal direction of the bone, and where the bone quality or skeletal status is predicted on the basis of values derived from this profile.

A large number of values or measures may be derived from the image data in order to obtain information relating to the density of the cortical bone from which the image data are generated. In the following, one of the more simple measures, the coefficient of variance, is used in the generation of the profile, and a simple medial level is derived from the profile.

However, as only the actual calculation of this variable within the given window will differ between individual measures, altering the present method into one generating profiles using any other known density variation measure will be easy and obvious to the skilled person.

Alternatively, a simple density profile may be generated and a method deriving a variation thereof may be used in order to derive one or more values relating to the variation in the density.

Coefficient-Of-Variance Profiles
1. The image is scanned at 500 lines per centimetre (lpc), and subsequently reduced using a mean filter with a kernel size of 3×3 and subsequently reducing resolution to 250 lpc using decimation.
2. A rectangular Region Of Interest (ROI) is extracted from the non-dominant radius or ulna. The size of the box in the radius is 1600×90. The size of the box in ulna is 1700×90. In the latter case, parts of the corticalis is present in the image, but this is subsequently eliminated by extracting a centred box of size 1700×70. In general, the part of the data, which is processed by the set of algorithms, should be extracted between the cortical edges. The box is aligned with the radius/ulna, and placed immediately below the lower edge of the projected endplate of the bone, as illustrated in FIGS. 5 and 6.
3. The ROI is now background corrected employing a median filter with a kernel size of 51×51, and subtracting th smoothed image from the original image. The image thus obtained is mean corrected (i.e. the average grey level is subtracted from the image), and the image grey-level histogram is stretched to match a Gaussian distribution High-frequency noise is removed using a median filter with a kernel of size 9×9.
4. Sliding windows, of size 90×70 from the radius and 70×70 from the ulna (i.e. basically the width of the extracted ROI), are extracted from the image. From each window, the grey-level coefficient of variance is estimated (i.e. $\hat{\sigma}, \hat{\mu}$). These windows are generated by first selecting the window having its upper side coincident with the upper side of the ROI. Subsequently, the windows are each translated one pixel down; the last window having its lower side coinciding with the lower side of the ROI.
5. The coefficient-of-variance (CV) profile is constructed as the estimated coefficient-of-variance plotted against the displacement of the extracted sub-window, relative to the top of the extracted ROI. Profiles are shown for a young normal, and elderly normal and an elderly osteoporotic in FIG. 1.

Feature Extraction—The Cortical Resorption Index

A few introductory remarks may be in given here. Endosteal and intra-cortical erosions are reflected in the radiographic image as low-frequency variations in the grey-levels. This is mostly reflected at the proximal end of the radius/ulna, where there is only cortical bone. For young normals, no erosion has been taken place, and hence there is no significant component of low-frequency variability to be measured in the cortical region. With age and disease progression, the degree of cortical resorption is increasing, leading to an increasing amount of low-frequency at the proximal end of the radius. This phenomenon is reflected in the CV profiles, as seen in FIG. 1, where the profile level in the proximal part is clearly higher for the osteoporotic person, than for the two others.

The cortical resorption index (CRI) is then measured as the median level in the proximal 20% of the profile.

Estimating the Bone Quality or Skeletal Status

Having derived the CRI feature, prediction of the bone quality or skeletal status may be obtained using reference data relating to CRI determined from e.g. cadavers the bone quality or skeletal status of which have been determined or estimated.

In this estimation, additional information such as the age of the person, a BMD measure, the sex of the person or features derived from eg the profile.

Correlation to BMD

As seen in FIG. 2, there is a strong correlation to densitometric measurements and, in particular, to wrist BMD. Note that the rank correlation is probably a more "honest" measure than an ordinary estimate of correlation. Clearly, something is gained by combining CRI in radius and ulna. Radius and ulna CRI have similar performance in terms of correlation to BMD (r=−0,81). For radius CRI, observations 419 and, in particular, 159 appear to be outliers. Also 437 appears to be an outlier, although it is more like to be an outlier for the wrist BMD measurement. Clearly, this individual has a very low radius BMD, that does not agree well with it's diagnosis. Moreover, 437 is an outlier both in the radius and the ulna plots, as seen in FIG. 3. Combining the two CRI measurements, the correlation increases significantly which is seen in FIG. 4. This can also be seen by using a multiple regression, including both CRI measurements as explanatory variables:

|            | Value   | Std. Error | T-value  | P > \|t\| |
|------------|---------|------------|----------|-----------|
| Intercept  | 0.7841  | 0.0511     | 15.3417  | 0.0000    |
| Radius CRI | −1.8208 | 0.6372     | −2.8573  | 0.0074    |
| Ulna CRI   | −1.1761 | 0.4036     | −2.9139  | 0.0065    |

The pattern is the same for hip BMD, but not for spine BMD, where the ulna CRI is apparently not significant.

Preferred Embodiment Two

In FIG. 7, different types of bone resorption are illustrated in a cross section of a radius.

Another preferred manner of deriving the variation value and especially for deriving information relating to spongiosation or intra cortical resorption is to derive information relating to oblong density variations in the image data.

Two manners are presently preferred in that respect, one of which uses a Difference Of Gaussians (DOG) procedure.

The Difference Of Gaussians may be seen as an equivalent to a band pass filter. In this procedure, two copies of the image data are filtered with two different filters—or Gaussian kernels having different sizes—one for each image. Naturally, this filtering will alter the image data.

In FIG. 8, this is seen in a one-dimensional case, where an original profile is shown together with this profile filtered with a medium frequency filter and a low frequency filter.

Subsequently, the two images are combined, whereby differences therebetween are enhances—differences relating to the frequency band between the two filters.

In two dimensions, this procedure may be used with different frequencies in the two dimensions. In this manner, oblong density variations may be identified, as different frequencies may be used identified in the two directions.

Consequently, two copies of the image data are generated, one being filtered with a Gaussian kernel having a size of 4×1 mm and one having a size of 12×3 mm, the longer dimension being along the longitudinal direction of the bone—the predominant direction of the spongiosation.

When subtracting these images, information will remain as to oblong density variations having dimensions within the intervals identified by the different kernels.

Subsequent to that, the spongiosation may be quantified by counting the number of such density variations, quantifying a mean grey level of the image data—over a background level—(due to the fact that only these oblong density variations are represented in the image data), or quantifying dimensions thereof.

This quantification of the density variation may be used as the variation value used in the present method.

Another method of deriving the information relating to these oblong density variations may be to Fourier transform the image data to obtain the power spectrum thereof. The image data being two dimensional, the power spectrum is also two dimensional. Therefore, points or areas may be defined at non-equal frequencies for the two dimensions, which frequencies represent oblong density variations.

The energy in such points/areas will directly relate to the number and/or "strength" (grey tone" of such density variations. This energy may itself be used to quantify the density variations, or the other parts of the power spectrum may be removed and the resulting power spectrum inversely Fourier transformed to obtain image data representing the oblong density variations. Subsequent to that, these density variations may be quantified as mentioned above in relation to the DOG.

What is claimed is:

1. A method for estimating the bone quality or skeletal status of a vertebrate on the basis of two-dimensional image data comprising information relating to the cortical bone of at least a part of a bone of the vertebrate, the image data being data obtained by exposing at least the part of the bone to electromagnetic radiation, the method comprising:

determining at least one value representing a variation of a density of cortical bone of the at least part of the bone, an estimation procedure in which the bone quality or skeletal status of the vertebrate is estimated on the basis of 1) the at least one variation value, and
2) optionally one or more features related to the bone of the vertebrate, and
3) a predetermined relationship between
   I) the at least one variation value and
   II) optional feature(s) and
   III) reference skeletal status or bone quality parameters, wherein the determined value is determined from a grey value difference between oblong density variations in the image data and other parts of the image data the oblong density variations extending at least in a longitudinal direction of the bone.

2. A method according to claim 1, wherein the oblong density variations have a length to width ratio of at least 1½:1.

3. A method according to claim 1, wherein the oblong density variations have a length to width ratio in the interval 1½–8:1.

4. A method according to claim 1, wherein the oblong density variations in the image data relate to oblong density variations, such as cavities, tunnels, channels, valleys, grooves, or the like, in the cortical bone.

5. A method according to claim 4, wherein the density variations of the bone have a length in the interval of 0.4–15 mm and a width in the interval 0.1–6 mm.

6. A method according to claim 1, wherein the oblong density variations of image data have a length in the interval of 0.4–15 mm and a width in the interval 0.1–6 mm.

7. A method according to claim 1, wherein the determined variation value is determined from a number of oblong density variations in the image data, a mean width thereof, and/or a mean length thereof.

8. A method according to claim 1, wherein the variation value is determined by:

obtaining the power spectrum relating to the image data, identifying parts thereof relating to frequencies or frequency intervals corresponding to predetermined dimensions or dimension intervals of the oblong variations, and a) estimating the energy at or within the frequencies or frequency intervals, and/or
b) removing at least substantially all other parts of the power spectrum, inversely Fourier transforming the resulting power spectrum, and determining a variation of the grey levels of the resulting image.

9. A method according to claim 1, wherein the variation value is determined by filtering the image data with an oblong Gaussian Kernel and subsequently determining a variation of grey levels of the resulting image.

10. A method according to claim 9, wherein the variation value is determined by filtering each two copies of the image data with an oblong Gaussian Kernel, the two oblong Gaussian kernels having different dimensions, and subsequently subtracting the two resulting image data and determining a variation of grey levels of the resulting image.

11. A method according to claim 9, wherein the oblong kernel(s) has/have a length to width ratio of at least 1½:1.

12. A method according to claim 9, wherein the oblong kernel(s) has/have a length to width ratio in the interval 1½–8:1.

13. A method according to claim 9, wherein the oblong kernel(s) has/have a length in the interval of 0.4–15 mm and a width in the interval 0.1–6 mm.

14. A method according to claim 10, wherein one oblong kernel has a length in the interval of 1–15 mm and a width in the interval 0.4–6 mm.

15. A method according to claim 1, wherein the at least one variation value is determined by:

providing a pre-determined template of the oblong density variations, template matching parts of the image data with the predetermined shape so as to identify oblong density variations, determining the variation value from a grey value difference between the identified oblong density variations and other parts of the image data.

16. A method according to claim 1, wherein one of the optional features is derived from the thickness of the cortical bone of the same or another tubular bone of the vertebrate.

17. A method according to claim 1, wherein one or more of the variation values is/are determined as a variation within a predetermined region of interest in the image data.

18. A method according to claim 1, wherein a fractal dimension of the variation of the density is determined, and wherein one or more of the at least one variation value is obtained on the basis of the fractal dimension.

19. A method according to claim 1, wherein a Fourier spectrum is generated on the basis of the image data, and wherein one or more of the at least one variation value is obtained on the basis of one or more frequencies in the Fourier spectrum.

20. A method according to claim 1, wherein the at least one variation value represents a variation in values reflecting a projected cortical density (PCD) in the image data, caused by the X-ray attenuating properties of cortical bone in the part of the bone.

21. A method according to claim 1, wherein the image data comprise discrete elements each relating to an individual part of the bone and each having a value relating to a projected cortical density in the image data at the individual part of the bone.

22. A method according to claim 20, wherein the image data are subjected to a thresholding splitting the elements of the image data into two groupings, a first grouping having values above a predetermined threshold value and a second grouping having values under the predetermined threshold value, and wherein one or more of the at least one variation value is obtained on the basis of a size of one or more coherent groups of elements all of which are part of the first or the second grouping.

* * * * *

UNITED STATES PATENT AND TRADEMARK OFFICE
CERTIFICATE OF CORRECTION

PATENT NO.   : 6,226,393 B1
DATED        : May 1, 2001
INVENTOR(S)  : Michael Grunkin et al.

It is certified that error appears in the above-identified patent and that said Letters Patent is hereby corrected as shown below:

Column 11,
Line 36, after "at least" insert -- substantially --.

Column 12,
Line 58, change "claim 20" to -- claim 21 --.

Signed and Sealed this

Twenty-fourth Day of December, 2002

JAMES E. ROGAN
*Director of the United States Patent and Trademark Office*